(12) United States Patent
Mangadlao et al.

(10) Patent No.: US 11,162,036 B1
(45) Date of Patent: Nov. 2, 2021

(54) POLYBENZOXAZINE ASPHALTENE INHIBITORS

(71) Applicants: Joey Dacula Mangadlao, Sugar Land, TX (US); Gordon Rivers, Houston, TX (US); David W. Jennings, Houston, TX (US); Jerry Weers, Richmond, TX (US)

(72) Inventors: Joey Dacula Mangadlao, Sugar Land, TX (US); Gordon Rivers, Houston, TX (US); David W. Jennings, Houston, TX (US); Jerry Weers, Richmond, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 15/931,176

(22) Filed: May 13, 2020

(51) Int. Cl.
*C10G 29/20* (2006.01)
*C08G 73/06* (2006.01)

(52) U.S. Cl.
CPC ............. *C10G 29/20* (2013.01); *C08G 73/06* (2013.01)

(58) Field of Classification Search
CPC ................ C08G 65/26; C08G 65/2612; C08G 65/2627; C08G 73/0233; C08G 73/06;
(Continued)

(56) References Cited

U.S. PATENT DOCUMENTS

| 5,039,437 A | 8/1991 | Martella et al. |
| 8,123,930 B2 | 2/2012 | Cohrs et al. |

(Continued)

FOREIGN PATENT DOCUMENTS

CN 105482848 A 4/2016

OTHER PUBLICATIONS

International Search Report for International Application No. PCT/US2021/030843, filed May 5, 2021, dated Aug. 24, 2021, 5 pages.
(Continued)

*Primary Examiner* — Sharon Pregler
(74) *Attorney, Agent, or Firm* — Cantor Colburn LLP

(57) ABSTRACT

A method of stabilizing asphaltenes in a petroleum hydrocarbon fluid is disclosed. The method includes contacting the petroleum hydrocarbon fluid with a polybenzoxazine comprising repeating structural units of Formula (I):

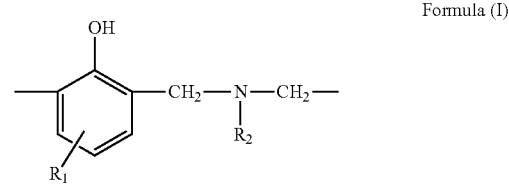

Formula (I)

wherein $R_1$ is hydrogen, a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl; and $R_2$ is a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl.

16 Claims, 2 Drawing Sheets

(58) Field of Classification Search
CPC .......... C08L 51/04; C08L 79/02; C08L 79/04; C08K 5/357
See application file for complete search history.

(56) References Cited

U.S. PATENT DOCUMENTS

| | | |
|---|---|---|
| 9,416,302 B2 * | 8/2016 | Salnikov ................ C08L 79/02 |
| 2017/0096606 A1 | 4/2017 | Pinappu et al. |
| 2020/0102513 A1 | 4/2020 | Gul et al. |
| 2020/0216429 A1 * | 7/2020 | Palmese ............... C07D 413/14 |

OTHER PUBLICATIONS

Written Opinion for International Application No. PCT/US2021/030843, filed May 5, 2021, dated Aug. 24, 2021, 3 pages.

* cited by examiner

POLYBENZOXAZINE ASPHALTENE INHIBITORS

BACKGROUND

Asphaltenes are heterocyclic macromolecules present in petroleum that cause adverse effects in both the production and refining of petroleum. In petroleum production operations, asphaltenes have deposited or accumulated in various locations ranging from the formation to well tubulars to flowlines to processing equipment causing a reduction or complete stoppage of production. Asphaltenes have also caused failure of critical safety valves. In petroleum refining, asphaltenes have been responsible for catalyst poisoning, coke formation, and fouling in heat exchangers. One method to reduce asphaltene deposition and asphaltene related fluid processing problems is to apply asphaltene inhibitor chemistries to the petroleum fluids. Various asphaltene inhibitors are known in the art. However, due to the high demand for asphaltene inhibitors, alternative materials and methods for preventing or reducing asphaltene deposition and/or accumulation would be well received in the art.

BRIEF DESCRIPTION

A method of stabilizing asphaltenes in a petroleum hydrocarbon fluid comprises contacting the petroleum hydrocarbon fluid with a polybenzoxazine comprising repeating structural units of Formula (I):

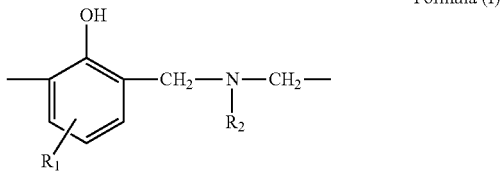

Formula (I)

wherein $R_1$ is hydrogen, a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl; and $R_2$ is a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl.

A petroleum hydrocarbon fluid comprises an asphaltene inhibitor or dispersion composition that contains a polybenzoxazine having the Formula (I).

BRIEF DESCRIPTION OF THE DRAWINGS

The following descriptions should not be considered limiting in any way. With reference to the accompanying drawings, like elements are numbered alike.

DETAILED DESCRIPTION

Figure 1:
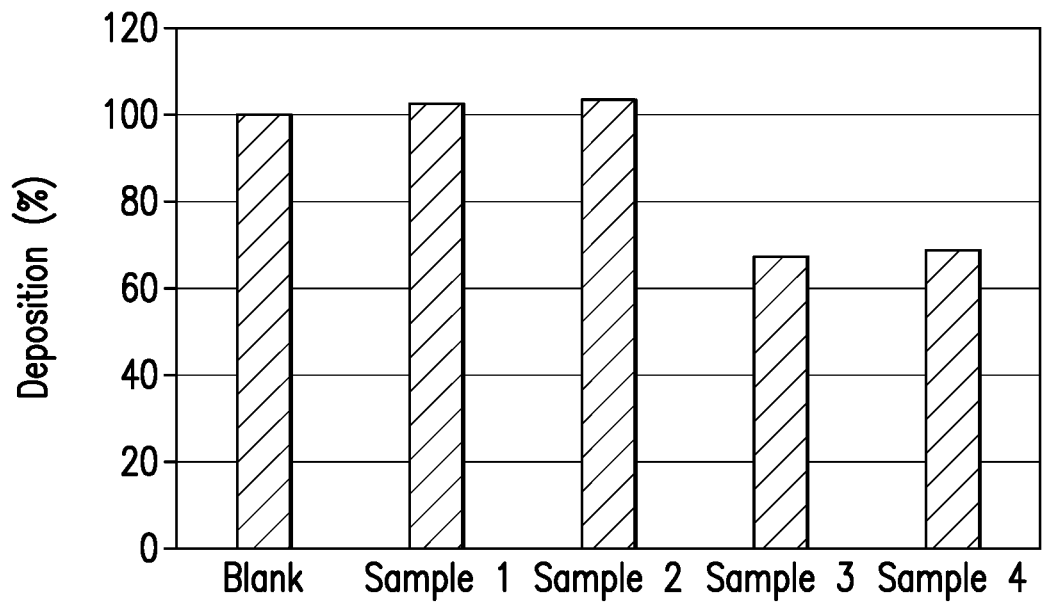
FIG. 1 compares the asphaltene control performance of phenol aldehydes with polybenzoxazines on Crude Oil #1 at 60° C.

The inventors hereof have found that polybenzoxazines can be used as asphaltene stabilizers and deposition inhibitors. "Polybenzoxazines" as used herein mean homopolymers or copolymers having repeating structural units of Formula (I):

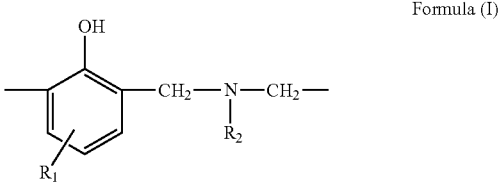

Formula (I)

wherein $R_1$ is hydrogen, a $C_{1-30}$ alkyl, a $C_{3-30}$ cycloalkyl, a $C_{6-30}$ aryl, a $C_{7-30}$ alkylaryl, a $C_{7-30}$ arylalkyl, a $C_{5-30}$ heteroaryl, or a $C_{3-30}$ heterocycloalkyl; and $R_2$ is a $C_{1-30}$ alkyl, a $C_{3-30}$ cycloalkyl, a $C_{6-30}$ aryl, a $C_{7-30}$ alkylaryl, a $C_{7-30}$ arylalkyl, a $C_{5-30}$ heteroaryl, or a $C_{3-30}$ heterocycloalkyl.

In an aspect, $R_1$ is hydrogen, a $C_{1-20}$ alkyl, a $C_{5-20}$ cycloalkyl, a $C_{6-18}$ aryl, a $C_{7-25}$ alkylarylene, a $C_{7-25}$ arylalkyl, a $C_{5-20}$ heteroaryl, or a $C_{5-30}$ heterocycloalkyl; and $R_2$ is a $C_{1-20}$ alkyl, a $C_{5-20}$ cycloalkyl, a $C_{6-18}$ aryl, a $C_{7-25}$ alkylarylene, a $C_{7-25}$ arylalkyl, a $C_{5-20}$ heteroaryl, or a $C_{5-30}$ heterocycloalkyl.

Preferably each of $R_1$ and $R_2$ is independently a $C_{4-18}$ alkyl or a $C_{4-12}$ alkyl such as dodecyl, nonyl, hexyl, t-butyl, and the like. $R_1$ and $R_2$ can be substituted or unsubstituted regardless whether substituted or unsubstituted is specifically mentioned or not.

As used herein, the term "alkyl" refers to a straight or branched chain, saturated monovalent hydrocarbon group regardless whether straight or branched chain is specifically mentioned or not. "Cycloalkyl" refers to a non-aromatic monovalent monocyclic or multicylic hydrocarbon group having at least three carbon atoms with cyclohexyl and cyclopentyl being exemplary cycloalkyl group. "Aryl" refers to an aromatic monovalent group containing only carbon in the aromatic ring or rings with phenyl being an exemplary aryl group. "Alkylaryl" refers to an aryl group that has been substituted with an alkyl group as defined above, with 4-methylphenyl being an exemplary alkylaryl group. "Arylalkyl" refers to an alkyl group that has been substituted with an aryl group or an alkylaryl group as defined above, with benzyl and xylyl being exemplary arylalkyl groups. "Heteroaryl" refers to an aromatic monovalent group containing carbon and at least a heteroatom in the aromatic ring or rings, wherein the heteroatom includes N, O, or S with pyridinyl being an exemplary heteroaryl group. "Heterocycloalkyl" refers to a non-aromatic monovalent monocyclic or multicylic group having at least three carbon atoms and at least one heteroatom such as N, O, or S.

Unless otherwise indicated, each of the foregoing groups for $R_1$ and $R_2$ can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. Exemplary groups that can be present on a "substituted" position include, but are not limited to, a halogen, a group having an N, S, O, or F atom, alkyl, cycloalkyl, alkenyl, or alkynyl.

Polybenzoxazines can be derived from monophenols, aldehydes, and amines. The monophenols can be substituted or unsubstituted. The substituents can be attached to the para, ortho, or both positions of the monophenol. Preferably the substituents are attached to the para position of the monophenol. More than one monophenols or more than one amines can be used.

The monophenol has a structure represented by Formula (II)

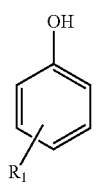

Formula (II)

wherein $R_1$ is the same as defined herein in the context of Formula (I). Substituted phenol can be an alkyl substituted monophenol. The alkyl substituents include $C_{1-20}$, $C_{4-18}$, or $C_{4-12}$ branched or linear alkyl groups. Exemplary phenols having branched alkyl groups include branched dodecyl phenol, branched nonyl phenol, tert-butylphenol, t-amyl phenol, and branched hexyl phenols such as 4-(1-methylpentyl) phenol, 4-(1,2-dimethylbutyl)phenol, and 4-(1-ethylbutyl) phenol, and 4-(1-ethyl-2-methylpropyl) phenol.

Examples of aldehydes include formaldehyde, paraformaldehyde, acetaldehyde, propionaldehyde, butyraldehyde, glyoxal, glutaraldehyde, 1,9-nonanedial, or a combination comprising at least one of the foregoing. Paraformaldehyde and formaldehyde are preferred.

The amines are preferably primary amines with the Formula (III) $NH_2$—$R_2$, wherein $R_2$ is the same as define herein in the context of Formula (1). An example of the primary amine is dodecyl amine.

The polybenzoxazines as described herein are excellent asphaltene stabilizers. The amount of the polybenzoxazines used to treat petroleum hydrocarbon fluids that contain asphaltenes can vary depending on the specific polybenzoxazines used, the specific chemistry of the petroleum hydrocarbon fluids as well as the conditions such as the pressure and temperature that the petroleum hydrocarbon fluids are exposed to during production, refining, and storage. In an embodiment, about 50 ppm to about 5000 ppm, or about 100 ppm to about 2500 ppm, or about 625 ppm to about 1250 ppm of the polybenzoxazines are used to treat petroleum hydrocarbon fluids. The amounts disclosed herein are based on the volume of the polybenzoxazines, not based on the volume of the polybenzoxazines solutions or dispersions that contain a solvent for the polybenzoxazines.

The polybenzoxazines can be used alone or in combination with co-additives such as amines, polyamines, phenolic resins for control of asphaltene precipitation. Examples of amines and polyamines include fatty acid based imidazoline, diethylenetriamine, tetraethylenetetramine, tetraethylenepentamine, or a combination comprising at least one of the foregoing. The phenol aldehyde resins include structural repeating units having the

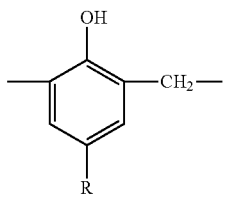

Formula (IV)

Formula (IV), wherein R is $C_{1-20}$, $C_{4-18}$, or $C_{4-12}$ branched or linear alkyl groups. The phenolic resin can be derived from formaldehyde and one or more substituted or unsubstituted monophenol.

The relative amounts of the co-additives and the polybenzoxazines can be determined depending on the specific chemistry of the petroleum hydrocarbon fluids to be treated as well as the conditions such as the pressure and temperature the petroleum hydrocarbon fluids are exposed to during production, refining, and storage. In an embodiment, the co-additives are used at dosages of about 1 to about 50% of the amount of the polybenzoxazines by weight. In another embodiment, the weight ratio of the polybenzoxazines relative to the synergistic additive is about 99:1 to about 1:99, or about 99:1 to about 1:10, or about 95:1 to about 5:1.

It is appreciated that both the polybenzoxazines and the co-additives can be added to the petroleum hydrocarbon fluids in the form of solutions or dispersions. The amounts disclosed herein are based on the weight of the co-additive and polybenzoxazines, not based on the weight of the co-additive/polybenzoxazines solutions or dispersions in another solvent.

The polybenzoxazines and the co-additives, if used, can be separately added to the petroleum hydrocarbon fluids to be treated. Alternatively or in addition, the polybenzoxazines and the co-additives can be combined first to provide an asphaltene inhibitor composition, and the petroleum hydrocarbon fluids are contacted with the asphaltene inhibitor composition containing both the polybenzoxazines and the co-additive.

In addition to the polybenzoxazines and the optional co-additives, the asphaltene inhibitor compositions can further include other components in the formulations. These components may be included to provide formulations with desirable physical properties or stability characteristics for process injection or storage considerations. Exemplary formulation components include solvents such as aromatic hydrocarbons, aliphatic hydrocarbons, alcohols, ethers, ketones, and aldehydes. The asphaltene inhibitor compositions can be formulated in various forms including, but are not limited to, solutions, dispersions, emulsions, and the like. Depending on the form of the asphaltene inhibitor compositions, additives such as water, surfactants, dispersants, emulsifiers, or a combination comprising at least one of the foregoing may be present.

Known additives can be added to enhance the performance of the asphaltene inhibitor compositions, such as in reducing asphaltene deposition and accumulation or for providing additional benefits to the products. Exemplary additives to provide additional benefits include dispersants, corrosion inhibitors, scale inhibitors, paraffin inhibitors, hydrate inhibitors, demulsifiers, sulfide scavengers, or a combination comprising at least one of the foregoing. Any known dispersants, corrosion inhibitors, scale inhibitors, paraffin inhibitors, hydrate inhibitors, demulsifiers, and sulfide scavengers can be used as long as the additives do not adversely affect the asphaltene inhibiting efficiency of the mixed phenolic aldehydes and the optional co-additives.

The polybenzoxazines and the co-additives can be used to reduce or prevent asphaltene deposition and/or accumulation from petroleum hydrocarbon fluids. As used herein, petroleum hydrocarbon fluids include crude oil, natural gas condensate, shale oil, shale gas condensate, bitumen, diluted bitumen (dil-bit), refinery fractions, finished fuel, finished petroleum products, and combinations thereof. Petroleum hydrocarbon fluids can further contain water, brines, gases such as hydrocarbon gases, or a combination comprising at least one of the foregoing. A method of treating a petroleum hydrocarbon fluid comprises contacting the petroleum hydrocarbon fluid with the polybenzoxazines and the optional co-additives if used.

The contacting can be conducted at a temperature of about −50° C. to about 250° C., for example about −5° C. to about 200° C. or about 20° C. to about 150° C. and a pressure of about 14.7 pounds per square inch absolute (psia) to about 40,000 psia or about 14.7 psia to about 20,000 psia.

The contacting can be conducted during the production, storage, transportation, and/or refining of the petroleum hydrocarbon fluids. In an embodiment for the production of petroleum, the contacting is conducted in a reservoir. Any known methods of introducing the polybenzoxazines into the reservoir can be used. For example, a squeeze process can be used to deliver the polybenzoxazines to a reservoir. In another embodiment for the production of petroleum, the polybenzoxazines can be applied in a continuous or batch injection process through a capillary line, down the backside of well annuluses, through an umbilical line, or through an umbilical/capillary line combination. When the contacting is conducted during storage, transportation and refinery, the polybenzoxazines can be added to the petroleum hydrocarbon fluids in storage tanks, pipes, processing units, refinery streams and the like.

The petroleum hydrocarbon fluids with the polybenzoxazines as disclosed herein can have reduced asphaltene deposition and/or accumulation, in terms of the amount, tendency, and/or the rate of deposition and/or accumulation. In an embodiment, provided are petroleum hydrocarbon fluids containing the polybenzoxazines and the optional co-additives or derivatives thereof in amounts as disclosed herein.

The asphaltene inhibitors are further illustrated by the following non-limiting examples.

Examples

A Baker Hughes' internally developed asphaltene deposition method was used to evaluate the performance of the samples. In the examples shown below, deposition percentage is plotted for various crude oil treated with Samples 1 to 5.

Sample 1 is a phenol aldehyde resin derived from nonylphenol and formaldehyde.

Sample 2 is a phenol aldehyde resin derived from dodecyl phenol and formaldehyde.

Sample 3 is a polybenzoxazine derived from nonylphenol, dodecylamine, and paraformaldehyde.

Sample 4 is a polybenzoxazine derived from dodecylphenol, dodecylamine, and paraformaldehyde.

Sample 5 is a commercial asphaltene inhibitor composed of a mixture of a phenol aldehyde resin derived from dodecyl phenol and formaldehyde and an amine additive.

Synthesis of Sample 3

To a 250 mL round bottomed flask equipped with a Dean-Stark distilling apparatus was charged with 47.7 g of nonylphenol, 15.90 g of xylene, and 22.12 g of dodecylamine. The chemicals were mixed at room temperature, then 14.29 g of paraformaldehyde was added. The reaction mixture was refluxed at 160° C. for 2 hours. Then three drops of boron trifluoride etherate (approx. 0.1 g) was added. The reaction mixture was further heated at reflux for 3 hours to form polybenzoxazine Sample 3.

Synthesis of Sample 4

To a 250 mL round bottomed flask equipped with a Dean-Stark distilling apparatus was charged with 43.65 g of dodecylphenol, 14.55 g of xylene, and 30.83 g of dodecylamine. The chemicals were mixed at room temperature then 10.98 g of paraformaldehyde was added. The reaction mixture was refluxed at 160° C. for 2 hours. Then three drops of boron trifluoride etherate (approx. 0.1 g) was added, and the reaction mixture was further heated at reflux for 3 hours to form polybenzoxazine Sample 4.

Samples 1-5 were evaluated for efficiency as asphaltene inhibitors on Crude Oil #1 or Crude Oil #2 at 60° C. The results are illustrated graphically in FIGS. 1-3.

As seen from FIG. 1, without using any corrosion inhibitor, the blank (Crude Oil #1) had 100% asphaltene deposition. When phenol aldehyde resin sample 1 or phenol aldehyde resin sample 2 was used in an amount of 1250 ppm, the percent of asphaltene deposition did not change compared to the blank. On the other hand, when polybenzoxazine sample 3 or polybenzoxazine sample 4 according to the disclosure was used at the same loading level, the percent of asphaltene deposition was reduced to 65% and 70% respectively compared to the blank. The results indicate that the polybenzoxazines as disclosed herein can be more effective asphaltene inhibitors than certain phenol aldehyde corrosion inhibitors.

Figure 2:
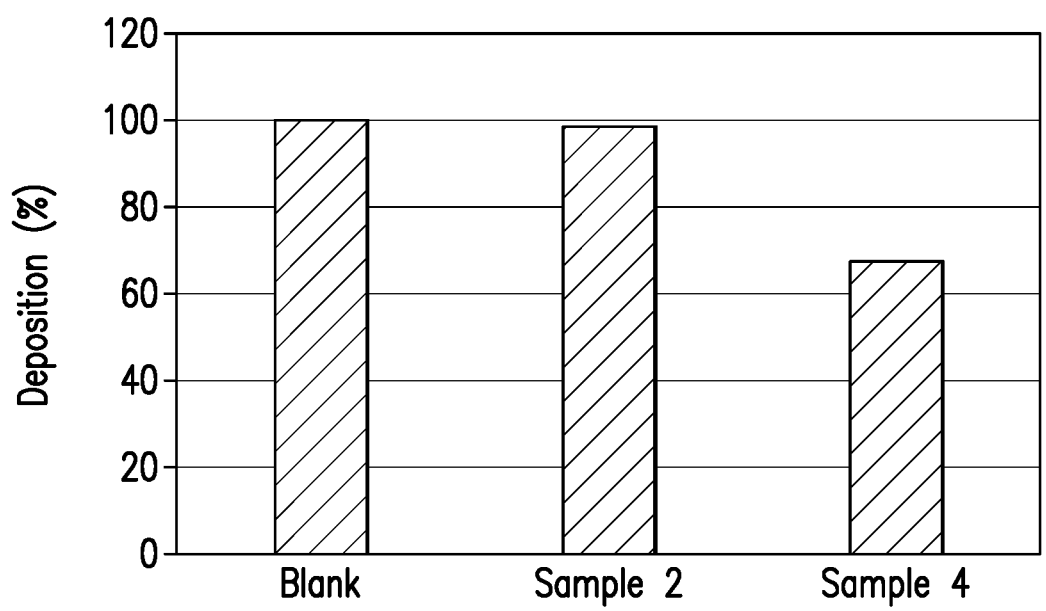
FIG. 2 compares the asphaltene control performance of a phenol aldehyde with a polybenzoxazine on Crude Oil #2 at 60° C.

FIG. 2 compares the efficiency of phenol aldehyde sample 2 and polybenzoxazine sample 4 as asphaltene inhibitors on Crude Oil #2 at 60° C. As seen from FIG. 2, the phenol formaldehyde sample 2 at 625 ppm loading level did not shown any improvement over the blank. On the other hand, when polybenzoxazine sample 4 was used at the same loading level and tested at the same temperature, 65% less deposition was achieved over the blank, which is much better than the phenol formaldehyde sample 2.

Figure 3:
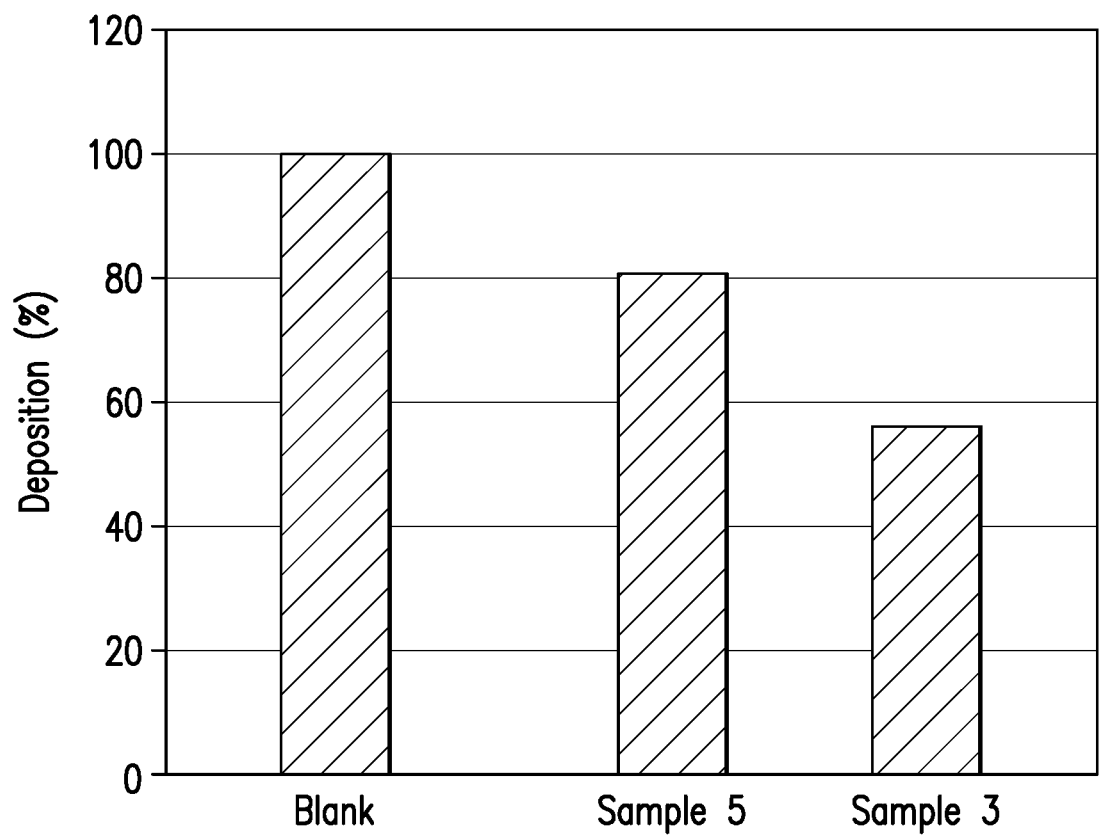
FIG. 3 compares the asphaltene control performance of a commercial asphaltene inhibitor with a polybenzoxazine on Crude Oil #1 at 60° C.

As shown in FIG. 3, without using any corrosion inhibitor, the blank (Crude Oil #1) had 100% asphaltene deposition. When sample 5 (a commercial corrosion inhibitor) was used, the amount of asphaltene deposition was reduced to 80%. Surprisingly when polybenzoxazine sample 3 according to the disclosure was used, the % of asphaltene deposition was reduced to about 56% compared to the blank. The results indicate that the polybenzoxazines as disclosed herein can be more effective asphaltene inhibitor than certain commercial corrosion inhibitors containing dodecyl phenol resin and an amine.

Set forth are various embodiments of the disclosure.

Embodiment 1. A method of stabilizing asphaltenes in a petroleum hydrocarbon fluid, the method comprising: contacting the petroleum hydrocarbon fluid with a polybenzoxazine comprising repeating structural units of Formula (I):

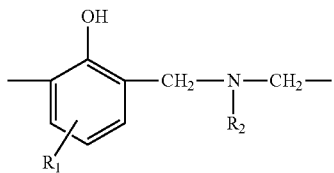

Formula (I)

wherein $R_1$ is hydrogen, a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl; and $R_2$ is a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl.

Embodiment 2. The method as in any prior embodiment, wherein $R_1$ and $R_2$ are each independently a $C_{1-20}$ alkyl group.

Embodiment 3. The method as in any prior embodiment, wherein $R_1$ and $R_2$ are each independently a dodecyl group or a nonyl group.

Embodiment 4. The method as in any prior embodiment, wherein an amount of the polybenzoxazine is about 50 ppm to about 5,000 ppm based on a total volume of the petroleum hydrocarbon fluid.

Embodiment 5. The method as in any prior embodiment, wherein an additive is used together with the polybenzoxazine to treat the petroleum hydrocarbon fluid, and the additive comprises an amine, a polyamine, a phenol aldehyde resin, or a combination comprising at least one of the foregoing.

Embodiment 6. The method as in any prior embodiment, wherein the petroleum hydrocarbon fluid further contains water, brine, a gas, or a combination comprising at least one of the foregoing.

Embodiment 7. The method as in any prior embodiment, wherein the contacting is conducted during production, storage, transportation, and refining of the petroleum hydrocarbon fluid.

Embodiment 8. The method as in any prior embodiment, wherein the contacting is conducted at a temperature of about −50° C. to about 250° C. and a pressure of about 14.7 psig to about 40,000 psig.

Embodiment 9. A petroleum hydrocarbon fluid comprising: an asphaltene inhibitor or dispersion composition that contains a polybenzoxazine having the formula:

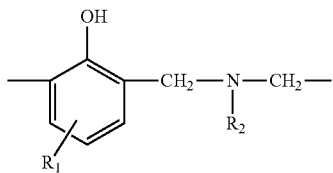

wherein $R_1$ is hydrogen, a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl; and $R_2$ is a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl.

Embodiment 10. The petroleum hydrocarbon fluid as in any prior embodiment, wherein $R_1$ and $R_2$ are each independently a $C_{1-20}$ alkyl group.

Embodiment 11. The petroleum hydrocarbon fluid as in any prior embodiment, wherein $R_1$ and $R_2$ are each independently a $C_{4-18}$ alkyl group.

Embodiment 12. The petroleum hydrocarbon fluid as in any prior embodiment, wherein the polybenzoxazine is present in an amount of about 50 ppm to about 5000 ppm based on a total volume of the petroleum hydrocarbon fluid.

Embodiment 13. The petroleum hydrocarbon fluid as in any prior embodiment, further comprising water, brine, a gas, or a combination comprising at least one of the foregoing.

Embodiment 14. The petroleum hydrocarbon fluid as in any prior embodiment, further comprising an additive, and the additive comprises an amine, a polyamine, a phenol aldehyde resin, or a combination comprising at least one of the foregoing.

Embodiment 15. The petroleum hydrocarbon fluid as in any prior embodiment, further comprising a phenol aldehyde resin derived from an aldehyde and an alkyl-substituted monophenol or unsubstituted monophenol.

Embodiment 16. The petroleum hydrocarbon fluid as in any prior embodiment, further comprising dispersants, corrosion inhibitors, scale inhibitors, paraffin inhibitors, hydrate inhibitors, demulsifiers, sulfide scavengers, or a combination comprising at least one of the foregoing.

Embodiment 17. The petroleum hydrocarbon fluid as in any prior embodiment further comprising asphaltene.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A method of stabilizing asphaltenes in a petroleum hydrocarbon fluid, the method comprising:
    contacting the petroleum hydrocarbon fluid with a polybenzoxazine comprising repeating structural units of Formula (I):

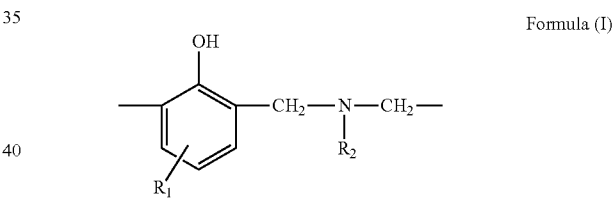

Formula (I)

wherein $R_1$ is hydrogen, a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl; and
$R_2$ is a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl.

2. The method of claim 1, wherein $R_1$ and $R_2$ are each independently a $C_{1-20}$ alkyl group.

3. The method of claim 1, wherein $R_1$ and $R_2$ are each independently a dodecyl group or a nonyl group.

4. The method of claim 1, wherein an amount of the polybenzoxazine is about 50 ppm to about 5,000 ppm based on a total volume of the petroleum hydrocarbon fluid.

5. The method of claim 1, wherein an additive is used together with the polybenzoxazine to treat the petroleum hydrocarbon fluid, and the additive comprises an amine, a polyamine, a phenol aldehyde resin, or a combination comprising at least one of the foregoing.

6. The method of claim 1, wherein the petroleum hydrocarbon fluid further contains water, brine, a gas, or a combination comprising at least one of the foregoing.

7. The method of claim 1, wherein the contacting is conducted during production, storage, transportation, and refining of the petroleum hydrocarbon fluid.

8. The method of claim 1, wherein the contacting is conducted at a temperature of about −50° C. to about 250° C. and a pressure of about 14.7 psig to about 40,000 psig.

9. A petroleum hydrocarbon fluid comprising:
an asphaltene inhibitor or dispersion composition that contains a polybenzoxazine having the formula:

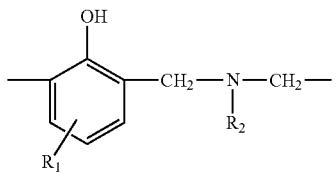

wherein $R_1$ is hydrogen, a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl; and
$R_2$ is a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl.

10. The petroleum hydrocarbon fluid of claim 9, wherein $R_1$ and $R_2$ are each independently a $C_{1-20}$ alkyl group.

11. The petroleum hydrocarbon fluid of claim 9, wherein $R_1$ and $R_2$ are each independently a $C_{4-18}$ alkyl group.

12. The petroleum hydrocarbon fluid of claim 9, wherein the polybenzoxazine is present in an amount of about 50 ppm to about 5000 ppm based on a total volume of the petroleum hydrocarbon fluid.

13. The petroleum hydrocarbon fluid of claim 9, further comprising water, brine, a gas, or a combination comprising at least one of the foregoing.

14. The petroleum hydrocarbon fluid of claim 9, further comprising an additive, and the additive comprises an amine, a polyamine, a phenol aldehyde resin, or a combination comprising at least one of the foregoing.

15. The petroleum hydrocarbon fluid of claim 9, further comprising a phenol aldehyde resin derived from an aldehyde and an alkyl-substituted monophenol or unsubstituted monophenol.

16. The petroleum hydrocarbon fluid of claim 9, further comprising dispersants, corrosion inhibitors, scale inhibitors, paraffin inhibitors, hydrate inhibitors, demulsifiers, sulfide scavengers, or a combination comprising at least one of the foregoing.

* * * * *